Figure 2:
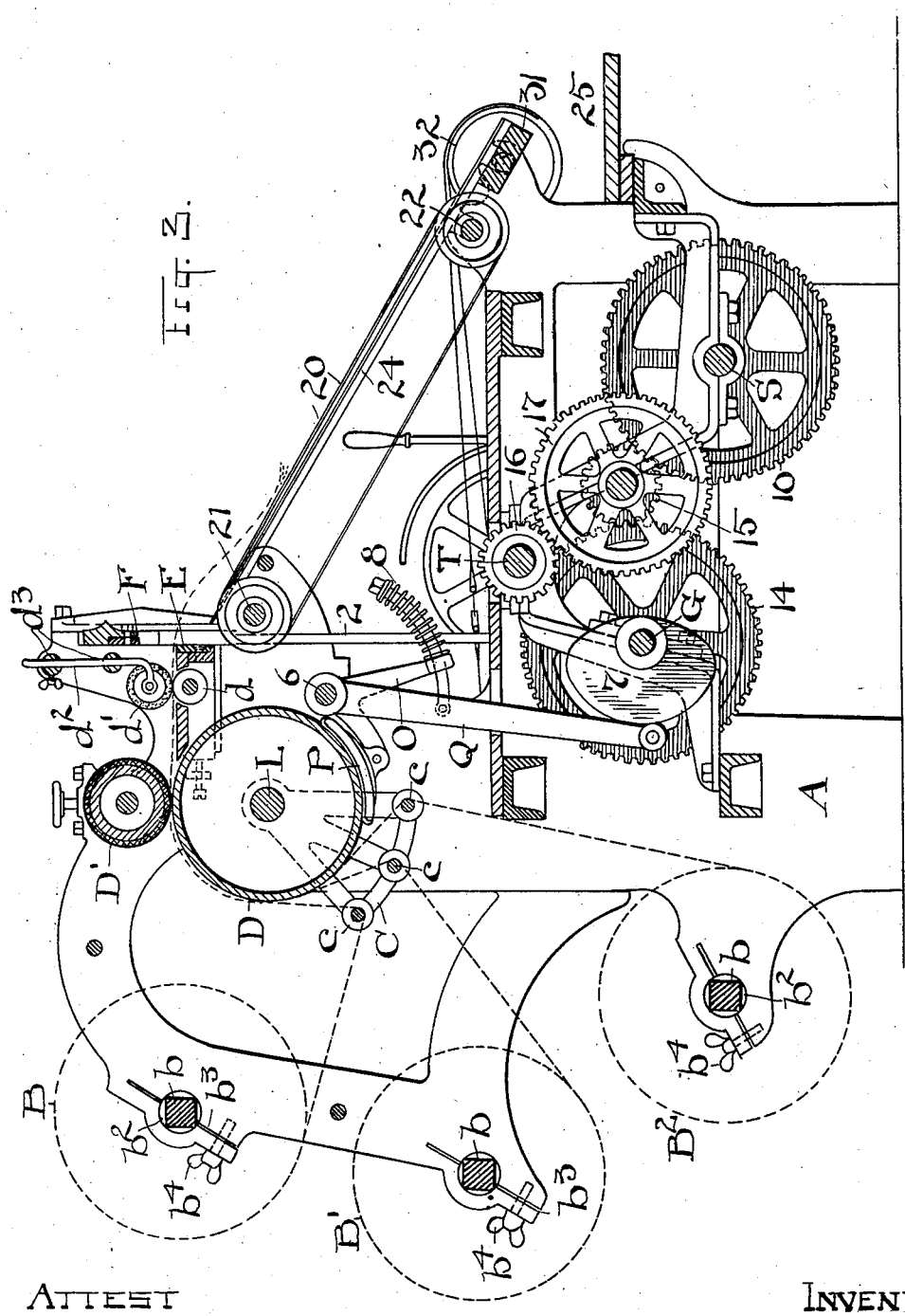

No. 678,371. Patented July 16, 1901.
H. G. BENDER.
MACHINE FOR CUTTING ROLLS OF WOVEN FABRIC.
(Application filed May 26, 1900.)
(No Model.) 5 Sheets—Sheet 1.
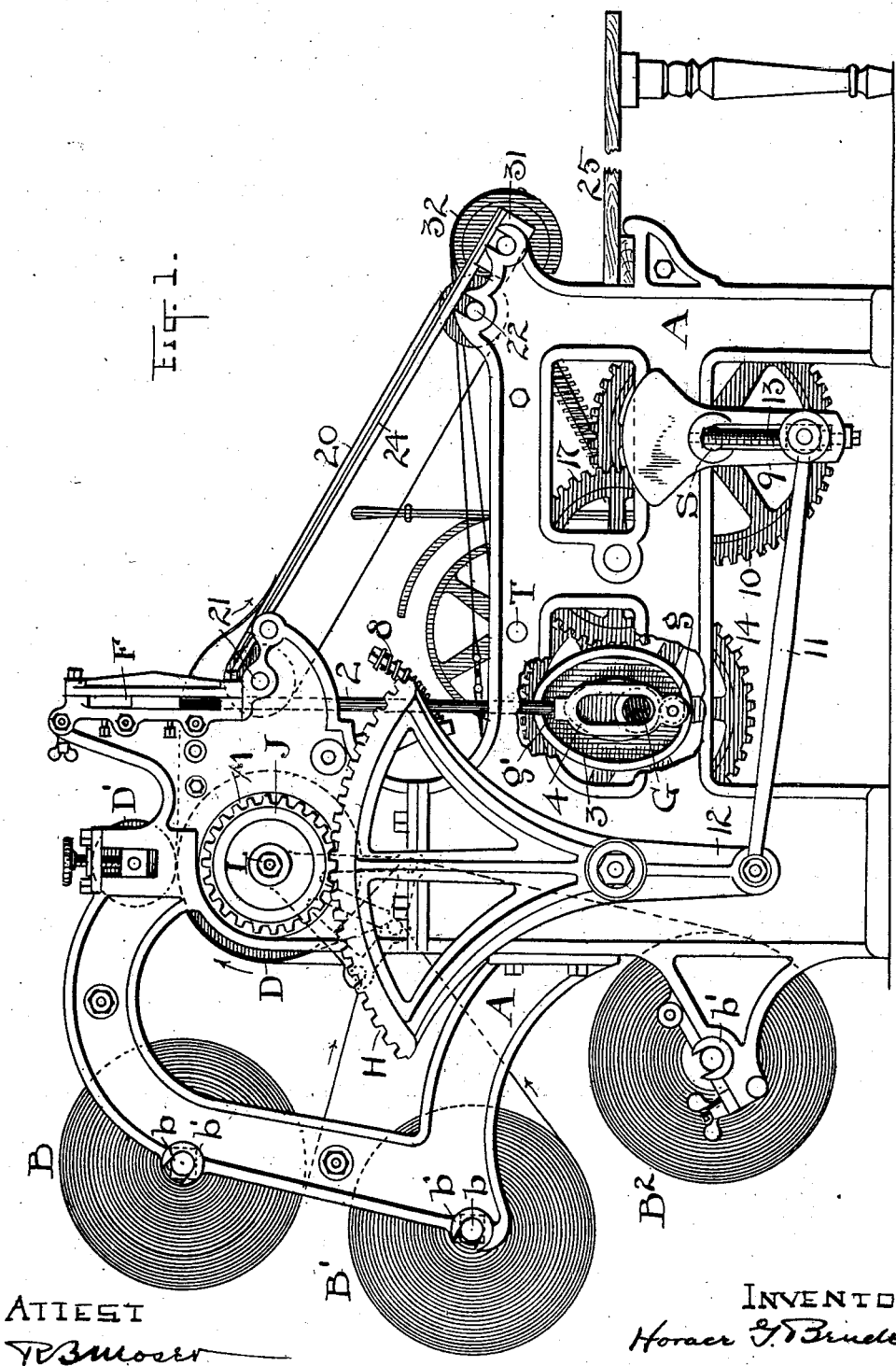
ATTEST
INVENTOR
Horace G. Bender
BY W. J. Fisher ATTY No. 678,371. Patented July 16, 1901.
H. G. BENDER.
MACHINE FOR CUTTING ROLLS OF WOVEN FABRIC.
(Application filed May 26, 1900.)
(No Model.) 5 Sheets—Sheet 2.
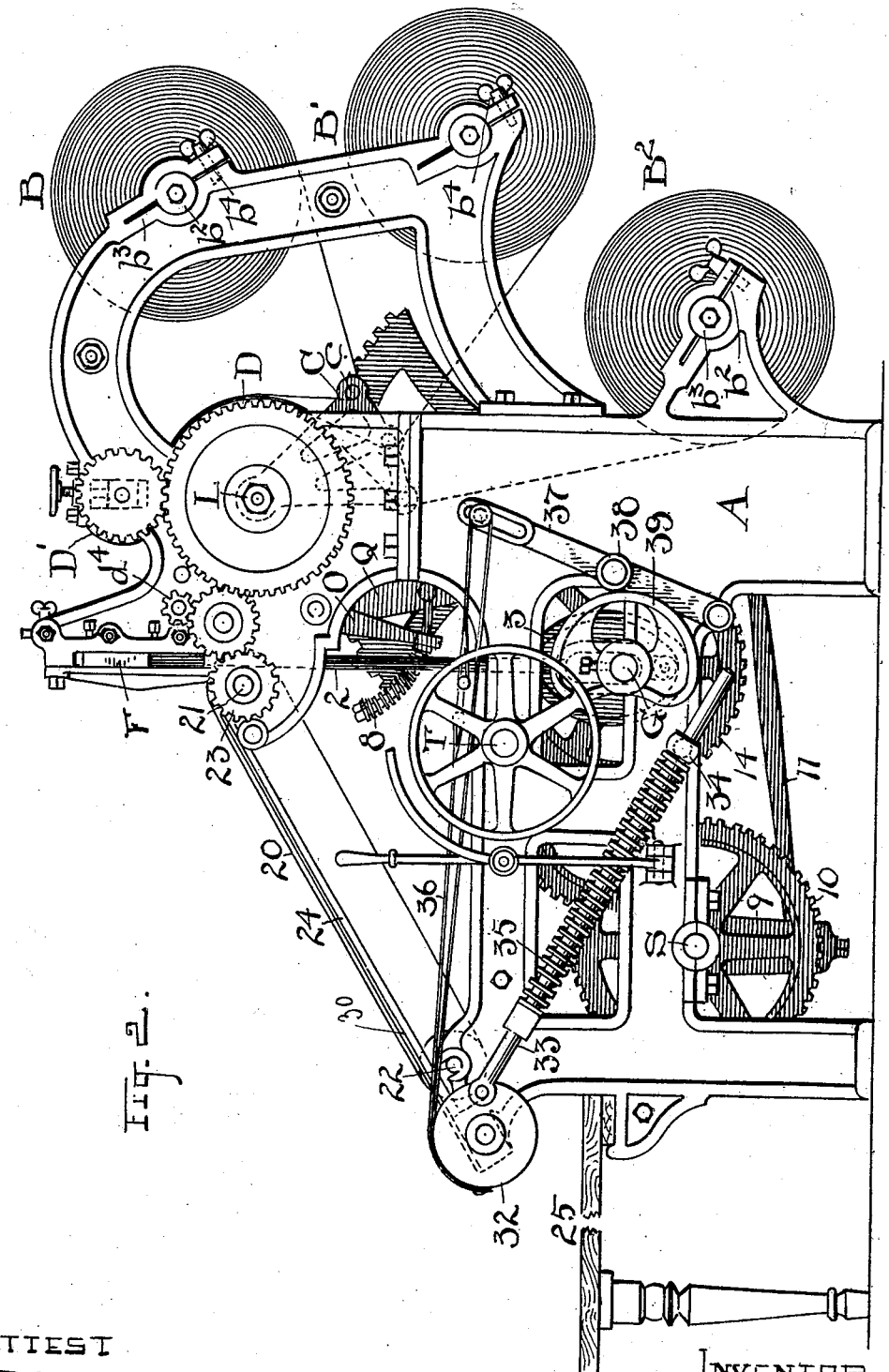

No. 678,371. Patented July 16, 1901.
H. G. BENDER.
MACHINE FOR CUTTING ROLLS OF WOVEN FABRIC.
(Application filed May 26, 1900.)
(No Model.) 5 Sheets—Sheet 3.

ATTEST
T. B. Moser
H. E. Mudra

INVENTOR
Horace G. Bender

BY H. F. Fisher ATTY

No. 678,371. Patented July 16, 1901.
H. G. BENDER.
MACHINE FOR CUTTING ROLLS OF WOVEN FABRIC.
(Application filed May 26, 1900.)
(No Model.) 5 Sheets—Sheet 4.
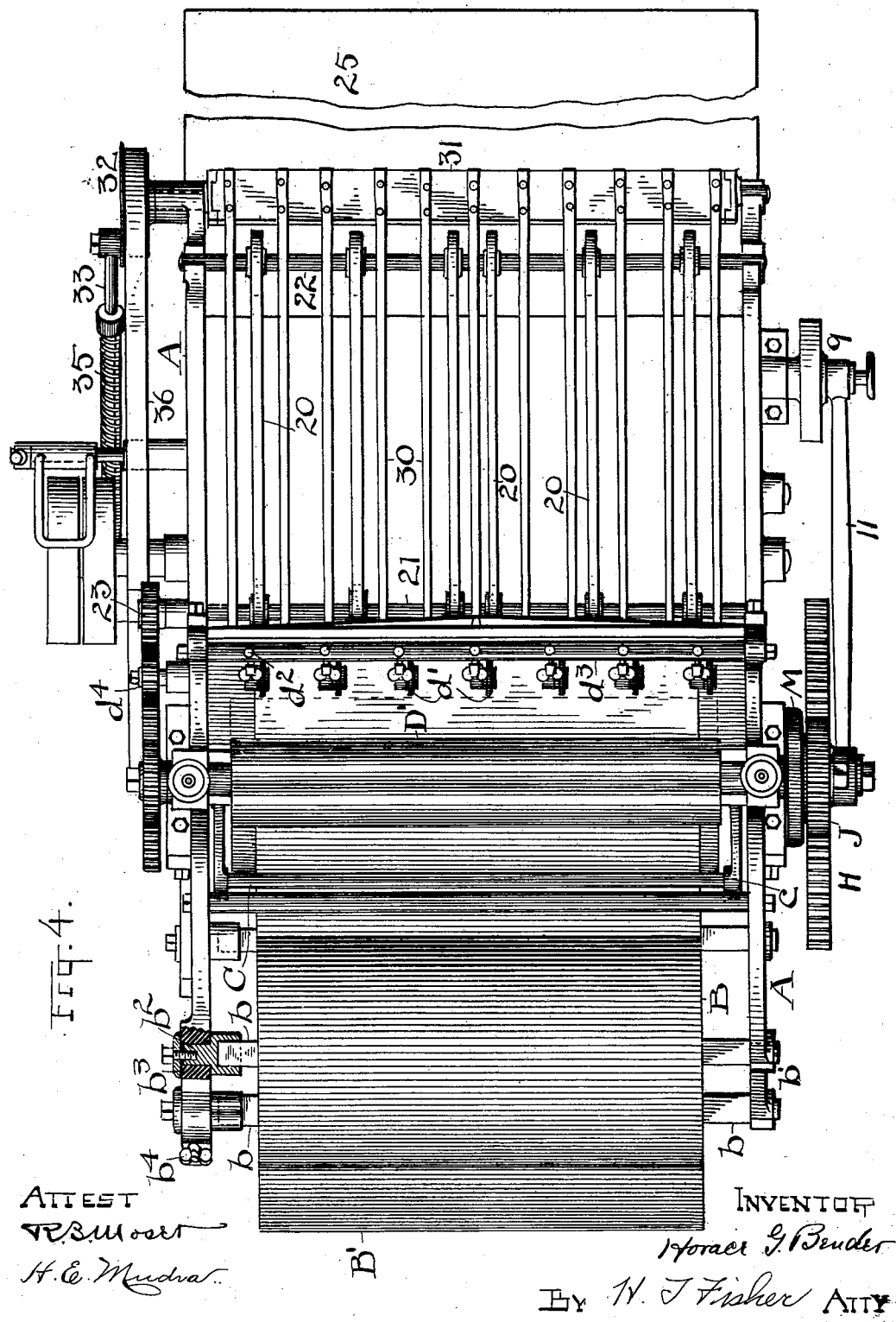
ATTEST
INVENTOR
Horace G. Bender
By H. J. Fisher Atty No. 678,371. Patented July 16, 1901.
H. G. BENDER.
MACHINE FOR CUTTING ROLLS OF WOVEN FABRIC.
(Application filed May 26, 1900.)
(No Model.) 5 Sheets—Sheet 5.
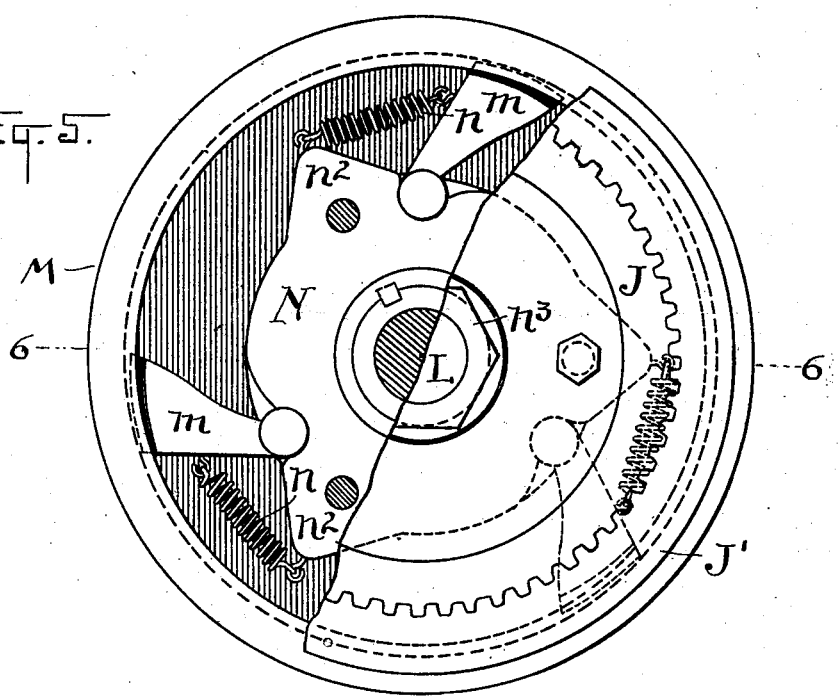
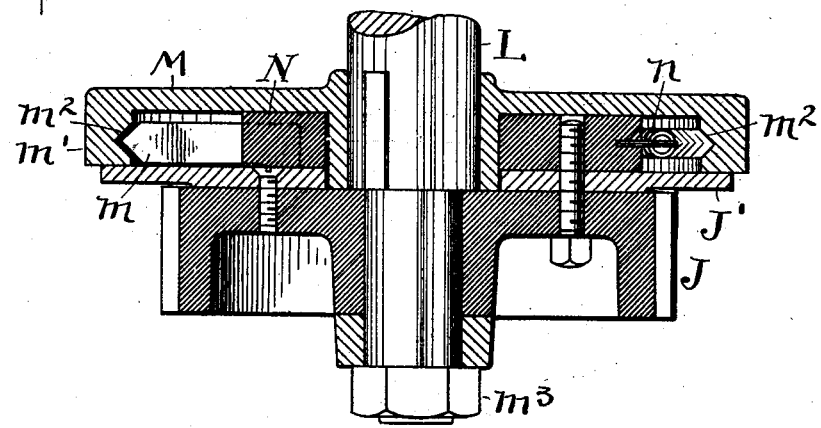
ATTEST.
R. B. Moser
H. E. Mudra
INVENTOR.
Horace G. Bender
BY H. F. Fisher ATTY

UNITED STATES PATENT OFFICE.

HORACE G. BENDER, OF AKRON, OHIO.

MACHINE FOR CUTTING ROLLS OF WOVEN FABRIC.

SPECIFICATION forming part of Letters Patent No. 678,371, dated July 16, 1901.

Application filed May 26, 1900. Serial No. 18,136. (No model.)

*To all whom it may concern:*

Be it known that I, HORACE G. BENDER, a citizen of the United States, residing at Akron, in the county of Summit and State of Ohio, have invented certain new and useful Improvements in Machines for Cutting Rolls of Woven Fabric; and I do declare that the following is a full, clear, and exact description of the invention, which will enable others skilled in the art to which it appertains to make and use the same.

My invention relates to a machine for cutting a roll of woven fabric into pieces of predetermined lengths, all substantially as shown and described, and particularly pointed out in the claims.

In the accompanying drawings, Figure 1 is a plain side elevation of the machine complete, and Fig. 2 is an elevation of the opposite side of the machine and in reverse position on the sheet. Fig. 3 is a central longitudinal sectional elevation of the machine looking in from the same side as Fig. 1. Fig. 4 is a plan view. Fig. 5 is an elevation of the automatic clutch mechanism for the feed-cylinder shaft, partly broken away at the left and partly in dotted lines at the right; and Fig. 6 is a cross-section of this mechanism on line 6 6, Fig. 5.

Now having the object of the invention in view, A represents the frame of the machine, and by this I mean the stationary and rigid portion, which carries the operating parts.

B B' B² are three several rolls of fabric to be worked up, supported on suitable shafts $b$, preferably square in cross-section, and having rounded ends in the open bearing $b'$ at one side and a separate rounded supporting member $b^2$ in a split bearing $b^3$ at the other side. A screw $b^4$ serves to tighten up split bearings $b^3$ more or less to prevent a too-free rotation of the roll as the fabric is drawn off.

In this machine I provide for three rolls; but I may use one or more, and all the lines of fabric pass together and one upon the other over the equalizer C onto the lower and larger feed-cylinder D. The equalizer C has three several rods $c$, one for each roll of fabric, and the weight thereof, as here arranged, is sufficient to keep the goods stretched from roll to cylinder, while the rods $c$ promote a smooth feed to the cylinder.

A tension-cylinder D' with preferably a rubber cover is supported over cylinder D, and between these cylinders the goods is drawn under the requisite tension from the rolls B B' B² and is carried forward between the secondary small roller $d$ and series of substantially disk-shaped rollers $d'$ above. These latter are covered with rubber and each supported on a rotatably-adjustable vertical standard $d^2$, resting in suitable cross-pieces $d^3$ or their equivalent, and the roll $d$ has power connections through pinion $d^4$, so that this also becomes a positive feed for the goods. These latter parts are located just behind the cloth cutters or shears comprising the lower and stationary blade or knife E and the upper drop knife or blade F. This blade is supported in a suitable guide-frame at its ends and is actuated by means of the two similar rods 2, pivotally connected with its ends and governed by a substantially egg-shaped cam 3 and a yoke-head 4, to which each rod is fixed. This mechanism is dual and alike in all particulars, so that the blade F rises and drops uniformly at both ends. Each yoke 4 has an oblong opening working over or upon the cam-shaft G, and at its bottom is a roller $g$, running in cam 3. The depth of cam 3 is such that when the small point $g'$ is down instead of up, as in Fig. 1, the blade F will be down also, and as the said cam has a fairly rapid movement the change of its position from its sides to its deepest end is such as to make practically an instantaneous action, the same as an independent drop would be. The operation of this severing mechanism necessitates something more than a momentary pause in the feed of the fabric, and hence a temporary though brief pause in the feed-rolls. To this end the lower feed-cylinder D is intermittently operated through segment H and gear J, the said gear being loosely mounted on the cylinder-shaft. Next inside of said gear is a clutch mechanism for said shaft, comprising a ring-wheel M, a clutch-carrying collar N within said wheel, and a set or series of dogs $m$, supported on the edge of said collar and having each a spring $n$ to draw or hold it back in position to engage. Its engaging portion is a segmental beveled edge, and the right-angled outer rim $m'$ of wheel M has an internal V-shaped channel $m^2$, in which the dogs $m$ work. They are always held back in this groove or channel by the springs $n$, and, having a firm abutment in or upon the collar N, a reverse rotation from idle position will at once make a working engagement—that is, supposing the wheel M to be stationary for a moment and the dogs $m$ sliding therein reversely, the instant a reverse and positive movement is set up the dogs will grip and carry wheel M and the shaft L, to which it is splined, forward. The gear J is attached to the collar N in clutch-wheel M through face-plate J' by means of screws here and there, and in this instance the end of shaft L is reduced in cross-section to receive said gear and the collar N turns on the hub of wheel M, over which the face-plate J' also is sleeved. This makes all the clutch mechanism practically internal and concealed by the face-plate J', which bears against the edge of the flange $m'$ of the clutch-wheel. The dogs $m$ are arranged tangentially to the axis of the collar, by which they are carried, and the collar has projections $n^2$ behind each dog, to which the springs $n$ are secured. The gear J and the parts connected thereto are confined by a nut $n^3$ and collar on the end of shaft L.

The clutch mechanism may be substituted by suitable pull-and-ratchet mechanism; but the former is preferred, because there is not the slightest lost motion and the operation is entirely noiseless.

It will be understood that the shaft L and its wheel and cylinder revolve only forward while the segment H plays back and forth and rotates gear J reversely, first one way and then the other, equal distances; but in the backward movement the cylinder D on shaft L is positively locked by brake-shoe P, Fig. 3. This shoe is carried by a bell-crank lever pivoted in its angle on pivot 6 with the actuating-lever Q, which latter is operated by a cam 7 on the cam-shaft G, and against which it is operatively held by spring 8, bearing against the crank-lever O and supported on a preferably segmental arm extending outward from near the middle top of lever Q. All these mechanisms are so arranged and adjusted that the brake P will be set an instant before the forward turning of cylinder D is stopped and the reverse movement of segment H begins to prevent the cylinder from further rotation by its own momentum, as well as to prevent its being carried backward by the clutch-dogs failing to disengage promptly, and also that it shall be released just before the next forward rotation begins. However, the shoe P always rides in touch with the cylinder D, though not under material pressure.

The segment H is oscillated from the counterweighted crank 9 on shaft S, carrying large gear 10, and a pitman 11 extends from said crank to the lower end of the segment-arm 12 in this instance. I prefer, however, to connect with the said arm above its pivot or nearer to the segment itself, and obviously other connecting mechanism could be devised to serve the same purpose, and all such I regard as within my invention.

The pitman 11 is adapted to be run up and down in respect to the crank 9 on the screw 13, so as to determine the throw of segment H and fix the distance of rotation of cylinder D each time, thereby determining also the length of goods to be cut.

The gears 10 and 14 have a pinion 15 playing between them and rotate at the same speed, and power is communicated thereto from main shaft T, pinion 16 thereon meshing with small gear 17 on the same shaft with gear 15. This combination of gears gives momentum to the fly-wheel and consequent steady motion to the running parts. Finally the pieces which have been cut off by knives E and F drop on the inclined apron, consisting of a series of tapes or straps 20, running over rollers on the respective shafts 21 and 22, and which are driven through gear 23 on the upper shaft 21, so as to carry the pieces downward onto the fly-fingers 30. A fly having a series of fingers 30 entering between tapes 20 serves to lay the pieces over onto the table 25, where they are stacked for removal in quantity. Sometimes I find that (with smooth-surfaced cloth particularly) the pieces will slide down on the ribbons 20 or their equivalent and not require their travel. The said fly is operated through mechanism seen in Fig. 2, where on the end of the cross-bar 31, carrying the fingers 30, there is a disk 32, with a spring-pressed eccentrically-connected rod 33 on said disk and having its opposite end slidable longitudinally in a keeper 34. The coiled spring 35 about this rod exerts a constant tension outward and is of such strength as to throw the fly forward and deliver the goods on the table 25, while the strap or cord 36, engaged on the periphery of the disk 32, is connected at its opposite end with lever 37. This lever is pivoted at its lower end on the machine-frame and has a side bearing 38, adapted to be engaged by the cam 39 on the cam-shaft G, and all the movements are timed to operate the fly when the cut off pieces have reached the right place for their delivery on table 25 and to retire the same, as in Fig. 2, when the receiving-tapes 20 are yet clear. Cam 39 on cam-shaft G properly times the movement of the flies for the length of the sheet being cut and is adjustably secured thereon for various-sized sheets. Here again any equivalent operating mechanism for the fly may be adopted without departing from the spirit of the invention.

What I claim is—

1. In a fabric-cutting machine, a series of fabric-rolls arranged each to carry a separate roll of fabric and a pair of cutter-blades in front thereof, a pair of tension-rolls to draw the fabric forward and an equalizing device associated with the tension-rolls, substantially as described.

2. The feed-rolls and a plurality of fabric-rolls having separate shafts, a free swinging equalizer for the fabric having a separate rod for each line of fabric and suspended beneath the feed-rolls, substantially as described.

3. The feed mechanism for the fabric comprising a feed-cylinder over which the fabric is drawn, clutch mechanism to turn said cylinder in one direction, a sector and gear to operate said mechanism in reverse directions and a brake for said cylinder, in combination with a series of fabric-carrying rolls arranged about said feed-cylinder, a set of cutters for the fabric from all said rolls and a secondary set of feed-rolls next to said cutters, substantially as described.

4. The feed-cylinder for the fabric and a shaft with which it rotates, a clutch on said shaft to rotate it in one direction intermittently, a gear loose on said shaft and connected with said clutch mechanism, a sector to operate said gear successively in opposite directions, and a brake for said cylinder, in combination with a fabric-roll, a set of cutters for the fabric and combined tension and feed rolls next to said cutters independent of said feed-cylinder, substantially as described.

5. The feed-cylinder and the brake comprising a crank-lever and shoe, a pivoted lever loosely connected with said crank-lever to loosen or tighten the brake-shoe on the cylinder, and a cam for actuating the free end of said pivoted lever, in combination with the fabric-rolls arranged about said cylinder, a set of cutter-blades and tension and feed rolls next to said blades, substantially as described.

Witness my hand to the foregoing specification this 30th day of April, 1900.

HORACE G. BENDER.

Witnesses:
O. B. FRANCE,
W. H. SPICER.